US006892702B2

(12) United States Patent
Isoda et al.

(10) Patent No.: US 6,892,702 B2
(45) Date of Patent: May 17, 2005

(54) IGNITION CONTROLLER

(75) Inventors: Naoya Isoda, Shuuchi-gun (JP); Yoshiyuki Nagatsu, Shuuchi-gun (JP)

(73) Assignee: Kabushiki Kaisha Moric, Mori-machi (JP)

(*) Notice: Subject to any disclaimer, the term of this patent is extended or adjusted under 35 U.S.C. 154(b) by 0 days.

(21) Appl. No.: 10/249,988

(22) Filed: May 23, 2003

(65) Prior Publication Data

US 2003/0168047 A1 Sep. 11, 2003

Related U.S. Application Data

(63) Continuation-in-part of application No. 09/682,457, filed on Sep. 5, 2001, now Pat. No. 6,626,145.

(30) Foreign Application Priority Data

Oct. 12, 2000 (JP) ........................................ 2000-311790
May 30, 2002 (JP) ........................................ 2002-156562

(51) Int. Cl.$^7$ ................................................ F02P 5/15
(52) U.S. Cl. .................................. 123/406.24; 123/436
(58) Field of Search ....................... 123/406.24, 406.18, 123/406.23, 406.25, 406.32, 406.5, 406.51, 436; 701/110, 111; 477/111

(56) References Cited

U.S. PATENT DOCUMENTS

| | | |
|---|---|---|
| 3,870,869 A | 3/1975 | Eberle et al. ................ 377/17 |
| 3,969,614 A | 7/1976 | Moyer et al. ............... 701/103 |
| 4,197,767 A | 4/1980 | Leung ......................... 477/98 |
| 4,276,600 A | 6/1981 | Hartford et al. ........... 701/109 |
| 4,291,383 A | 9/1981 | Tedeschi et al. ........... 701/102 |
| 4,301,678 A | 11/1981 | Full et al. .................... 73/116 |
| 4,309,759 A | 1/1982 | Tokuda et al. ............. 701/105 |
| 4,309,971 A | 1/1982 | Chiesa et al. ............... 123/480 |
| 4,380,800 A | 4/1983 | Wilkinson .................. 701/111 |
| 4,403,584 A | 9/1983 | Suzuki et al. ........... 123/406.23 |
| 4,433,381 A | 2/1984 | Wilkinson .................. 701/103 |
| 4,483,184 A | 11/1984 | Kunzfeld ................... 73/117.2 |
| 4,527,523 A | 7/1985 | Daumer et al. ........ 123/406.24 |
| 4,532,592 A | 7/1985 | Citron et al. ............... 701/105 |
| 4,590,563 A | 5/1986 | Matsumura et al. ....... 701/105 |
| 4,697,561 A | 10/1987 | Citron .................... 123/339.14 |
| 4,725,955 A | 2/1988 | Kobayashi et al. ......... 701/103 |
| 4,799,469 A | * 1/1989 | Nagano et al. ......... 123/406.24 |
| 4,814,997 A | 3/1989 | Matsumura et al. ....... 701/103 |
| 4,829,440 A | 5/1989 | Abe ............................ 701/109 |
| 4,840,245 A | 6/1989 | Kamei et al. ............... 180/179 |
| 4,852,537 A | 8/1989 | Nagano et al. ......... 123/406.25 |
| 4,870,586 A | 9/1989 | Asakura et al. ............ 701/109 |
| 4,879,656 A | 11/1989 | Quigley et al. ............. 701/105 |
| 4,884,547 A | 12/1989 | Tamura ....................... 123/694 |
| 4,887,216 A | 12/1989 | Ohnari et al. ............... 701/105 |
| 4,893,600 A | 1/1990 | Holmes .................... 123/406.2 |
| 4,911,128 A | 3/1990 | Hara et al. .................. 123/488 |
| 4,924,831 A | 5/1990 | Piteo et al. ............. 123/406.57 |
| 4,928,652 A | 5/1990 | Shinya et al. ............... 477/111 |

(Continued)

FOREIGN PATENT DOCUMENTS

| | | |
|---|---|---|
| GB | 2196153 | 4/1988 |
| GB | 2297988 | 5/1991 |
| GB | 5313200 | 11/1997 |

OTHER PUBLICATIONS

Development of a Low–Cost Fuel Injection System For Use on Small Utility Engines, SAE 1999–01–3292/JSAE 9938047, pp. 360–367, Paul M. Gartner, Copyright 1999 Society of Automotive Engineers, Inc.

*Primary Examiner*—Willis R. Wolfe, Jr.
(74) *Attorney, Agent, or Firm*—Ernest A Beutler

(57) ABSTRACT

A number of embodiments of improved engine system control method and apparatus based on operator demand and rate of change in demand that reduce not only the number of components but also decrease the complexity of the electronic system without requiring a throttle position sensor.

10 Claims, 14 Drawing Sheets

U.S. PATENT DOCUMENTS

| | | | |
|---|---|---|---|
| 4,951,206 A | 8/1990 | Kyohzuka | 701/103 |
| 4,991,102 A | 2/1991 | Sakamoto et al. | 701/109 |
| 5,021,956 A | 6/1991 | Yoshimura et al. | 701/105 |
| 5,021,959 A | 6/1991 | Jundt et al. | 701/105 |
| 5,086,741 A | 2/1992 | Nakamura et al. | 123/406.2 |
| 5,099,429 A | 3/1992 | Onari et al. | 701/103 |
| 5,121,324 A | 6/1992 | Rini et al. | 701/105 |
| 5,184,589 A | 2/1993 | Nonaka | 123/352 |
| 5,191,531 A | 3/1993 | Kurosu et al. | 701/103 |
| 5,218,945 A | 6/1993 | Kapellen et al. | 123/352 |
| 5,249,130 A | 9/1993 | Mamiya et al. | 701/109 |
| 5,278,762 A | 1/1994 | Kawamura | 701/105 |
| 5,284,116 A | 2/1994 | Richeson, Jr. | 123/406.2 |
| 5,341,299 A | 8/1994 | Stellwagon et al. | 701/105 |
| 5,345,817 A | 9/1994 | Grenn et al. | 73/117.3 |
| 5,392,753 A | 2/1995 | Burson et al. | 123/406.57 |
| 5,445,014 A | 8/1995 | Fiorenza, II et al. | 73/117.3 |
| 5,485,382 A | 1/1996 | Seki et al. | 701/109 |
| 5,548,514 A | 8/1996 | Hasegawa et al. | 701/103 |
| 5,566,071 A | 10/1996 | Akazaki et al. | 701/103 |
| 5,575,268 A | 11/1996 | Hirano et al. | 123/701 |
| 5,577,475 A | 11/1996 | Backer et al. | 123/479 |
| 5,629,853 A | 5/1997 | Ogawa et al. | 701/103 |
| 5,672,817 A | 9/1997 | Sagisaka et al. | 73/118.1 |
| 5,681,239 A | 10/1997 | Toukura | 477/107 |
| 5,684,248 A | 11/1997 | Iwata | 73/118.1 |
| 5,988,140 A | 11/1999 | Gartner et al. | 123/406.24 |
| 6,023,651 A | 2/2000 | Nakamura et al. | 701/110 |
| 6,234,145 B1 | 5/2001 | Shomura | 123/406.24 |
| 6,272,425 B1 | 8/2001 | Herndon | 701/105 |
| 6,343,586 B1 | 2/2002 | Muto et al. | 123/406.25 |
| 6,626,145 B2 * | 9/2003 | Enoyoshi et al. | 123/406.24 |
| 6,640,777 B2 * | 11/2003 | Enoyoshi et al. | 123/406.24 |
| 2003/0136379 A1 * | 7/2003 | Nagatsu et al. | 123/406.24 |

* cited by examiner

IGNITION CONTROLLER

CROSS REFERENCE TO RELATED APPLICATIONS

This application is a continuation in part of the application entitled, "ENGINE CONTROL METHOD AND APPARTUS" Ser. No., 09/682,457, filed, Sep. 5, 2001, now U.S. Pat. No. 6,626,145 in our names and that of another inventor; which application is assigned to the assignee hereof.

BACKGROUND OF INVENTION

The aforenoted co-pending application disclosed a very simple but highly effective way of determining engine load and controlling an engine control system in response to the determined load to improve engine operation. That method and apparatus, because of its simplicity, permits incorporation in relatively small and low production volume engines as used in motorcycles, motor scooters and like engine applications.

In addition to controlling an engine system to improve its operation, transient conditions frequently are considered to fine tune engine operation. For example, in addition to instantaneous load or operator demand, a change in either load or demand may require a modification of the system control to provide smoother and more efficient operation.

For example, ignition control is generally set in response to operator demand, often determined by throttle position. The basic timing determined by the throttle position could advantageously improved by also considering the state of acceleration or deceleration. This can be done by determining the rate of change in the degree of throttle opening. In a vehicle such as a motorcycle, to prevent a wheelie (the front wheel being raised off of the ground) when the throttle is rapidly opened at the time of starting, the output is lowered, and in normally accelerated running, the output is increased to improve the acceleration performance. In such cases, the output can be decreased by retarding the ignition timing. On the other hand under other conditions, the output can be increased by advancing the ignition timing.

A conventional arrangement for determining acceleration and deceleration uses a throttle position sensor for detecting the throttle opening and a throttle position detecting circuit connected to the throttle position sensor. Also there is provided a circuit for obtaining the rate of change in the throttle position.

However, using a throttle position sensor and a throttle position detecting circuit that also determines the rate of change in throttle position increases the number of components and makes the control system complicated. On top of that, the components are expensive and increase the vehicle price. In small vehicles in particular, the space around the engine is limited and so the layout of components is also a problem. This sometimes results in that there is no space for the throttle position sensor or, if the throttle position sensor is installed, the layout of other components is greatly restricted.

Therefore it is a principle object of the invention to provide an improved engine system control method and apparatus based on operator demand and rate of change in demand that reduces not only the number of components but also decreases the complexity of the electronic system.

It is a further object of the invention to provide an improved engine system control method and apparatus based on operator demand and rate of change in demand that does not require a throttle position sensor.

SUMMARY OF INVENTION

A first feature of the invention is adapted to be embodied in an internal combustion engine and control system therefore. The engine includes a driven shaft. A sensor arrangement is associated with the driven shaft for sensing the rotational speed of the driven shaft during the rotation of the driven shaft. An engine control system controls a running condition of the engine. A basic condition of the engine is determined from the output of the engine speed sensor. A control signal is delivered to the engine control system based on the sensed basic condition. The degree of change in the basic condition during a cycle interval is determined and if the degree of change in the basic condition is other than a predetermined amount the control signal to the engine control system is changed to compensate for the altered condition.

Another feature of the invention is adapted to be embodied in a method of operating an internal combustion engine and a control system therefore. The engine includes a driven shaft. A sensor arrangement is associated with the driven shaft for sensing the rotational speed of the driven shaft during the rotation of the driven shaft. An engine control system controls a running condition of the engine. The method comprises determining a basic condition of the engine from the output of the engine speed sensor and delivering a control signal to the engine control system based on the sensed basic condition. The degree of change in the basic condition during a cycle interval is then determined and if the degree of change in the basic condition is other than a predetermined amount, the control signal to the engine control system is changed to compensate for the altered condition.

As further features of the invention, the system and the system controlled is the engine ignition system.

DETAILED DESCRIPTION

Before describing the invention in detail by reference to the figures hereof, the disclosure of the aforenoted application is hereby incorporated by reference as it shows more details of the basic type of engine with which the invention may be utilized and also the basic spark control apparatus and method. However it is also believed that from the following description those skilled in the are will readily understand how to practice the invention, not only with the basic structure and methodology as shown in that application, but also with a wide variety of engine controls where transient control would be a valuable addition.

Figure 1:
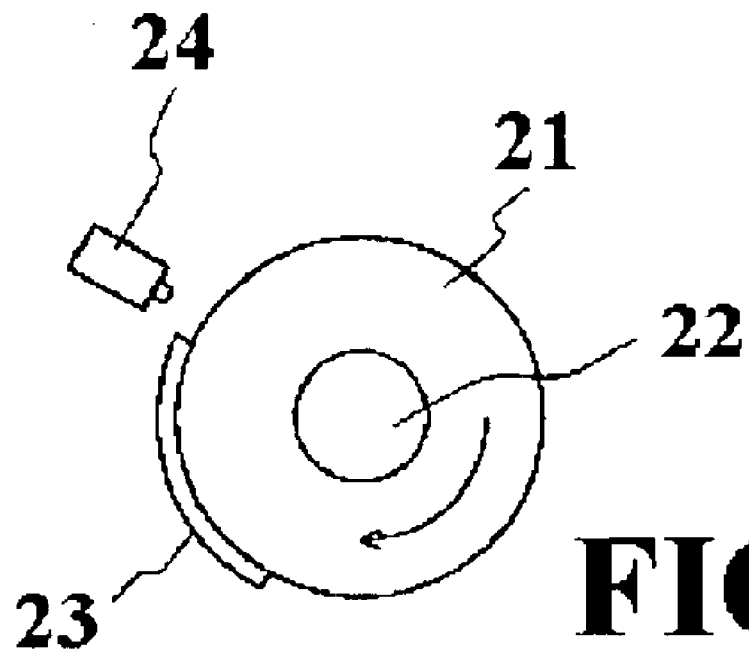
FIG. 1 is a view showing an engine shaft speed sensor employed with the engine control structure and method of the invention.

Referring now in detail to the drawings and initially to FIG. 1, an engine speed sensor is depicted as associated, for example, with an engine driven shaft element of an associated internal combustion engine of any desired type. Specifically a flywheel 21 is affixed for rotation with an engine shaft and specifically in this embodiment a crankshaft 22. The crankshaft 22 is journalled for rotation within a body of the engine, as is well known in this art. The flywheel 21 carries a timing mark 23, which as noted in the aforenoted co-pending application has a greater circumferential extent than those normally used in the art. In a preferred embodiment the circumferential length of the mark 23 is about 60° of crankshaft rotation and the leading edge of the mark 23 is a few degrees before top dead center (tdc).

Figure 2:
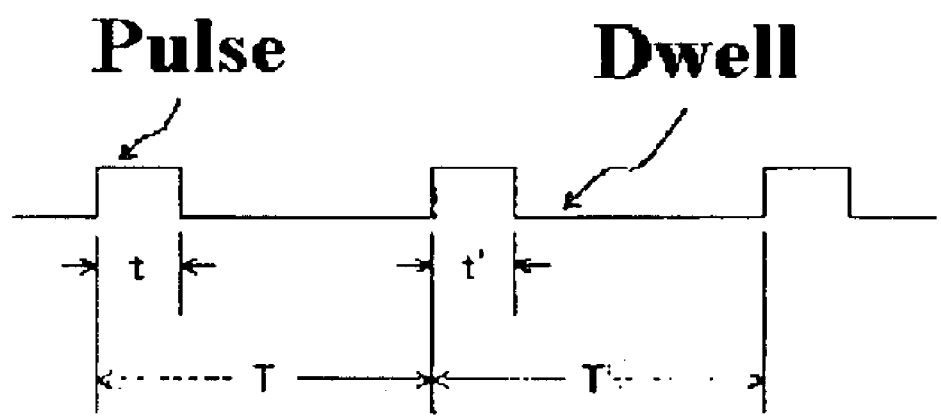
FIG. 2 is a graphical view showing the output of the sensor shown in FIG. 1.

A sensor coil 24 cooperates with the timing mark 23 and generates positive and negative pulses as the leading and trailing edges of the timing mark 23 pass the sensor coil 24. These pulses are roughly approximated as shown in FIG. 2. The remaining portion of the rotation causes no output as also shown in FIG. 2. A conventional ignition timing sensor may be used for the sensor coil 24.

The time interval T between two leading edge pulse signals is the time for the shaft 22 to complete one revolution and hence the instantaneous shaft speed for this revolution is the inverse function of that time interval. On the other hand, the time interval t for the timing mark 23 to pass the sensor coil 24 is the instantaneous time for the shaft 22 to complete a partial revolution immediately before tdc.

As noted in the aforenoted co-pending application, the ratio t/T calculated as a degree of rotational variation "D" is directly related to engine load. Thus the engine load is determined using a map stored in a memory of a microcomputer. As for the map, the correlation between the degree of rotational variation, the rotational speed of the crankshaft and the engine load is determined by a preliminary experiment or the like, and the three-dimensional map obtained is stored in the memory. Thus the basic ignition timing for the engine can be set using this data. In addition, a difference D–D' is calculated as the change in the degree-of-rotational speed variation on successive intervals. Engine operation state is judged and ignition timing is controlled as described later according to the values of D and D–D'.

A first embodiment for practicing the will now be described now by reference first to FIG. 3. In this embodiment, an ignition controller 25 is made up of an operation circuit 26, a power supply circuit 27, and an ignition circuit 28. The power supply circuit 27 is connected to a battery 29 through a main switch 31.

The ignition circuit 28 supplies a firing signal to an ignition coil 32 and to an ignition plug (not shown) of the associated engine (not shown). The pickup coil 24 outputs its signals to the operation circuit 26. The operation circuit 26 is made up of a rotational speed detecting section 33, a degree-of-rotational speed variation detecting section 34, a degree-of-rotational speed variation change detecting section 35, an output correction determining section 36, an output correction operation section 37, and an ignition timing determining section 38.

The rotational speed detecting section 33 detects the rotational speed from the detection signal coming from the pickup coil 24 as described previously. The degree-of-rotational speed variation detecting section 34 and the degree-of-rotational speed variation change detecting section 35 respectively detect the degree-of-rotational speed variation D and the degree-of-rotational speed variation change D' from the detection signal coming from the pickup coil 24 also as described above.

The output correction determining section 36 compares the degree-of-rotational speed variation change D' with a predetermined reference value to determine the necessity of increasing or decreasing correction of output relative normal engine operation. Along with the degree-of-rotational speed variation change D', the degree-of-rotational speed variation change D may also be compared with a predetermined reference value to determine the necessity of increasing or decreasing correction of output.

Figure 6:
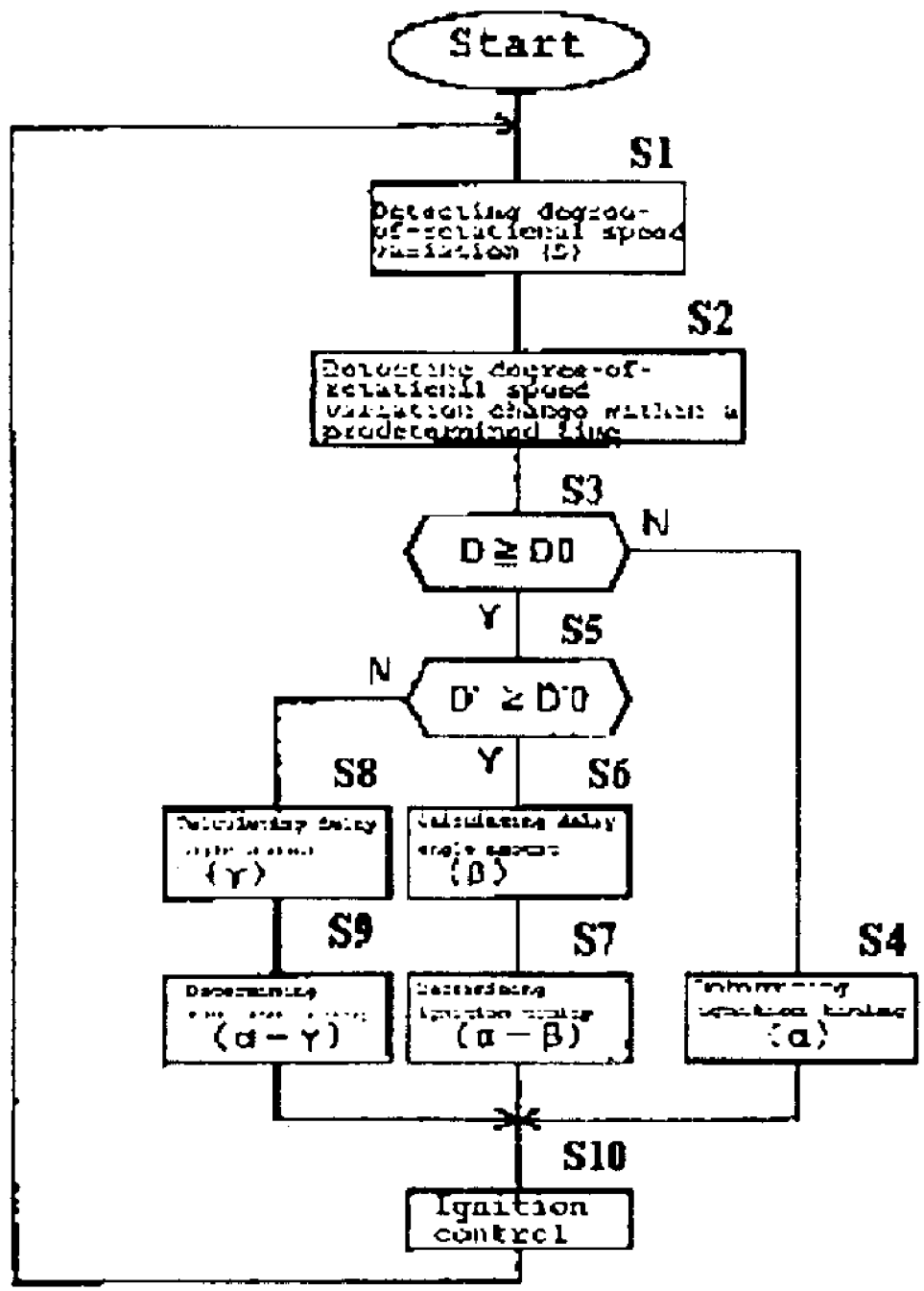
FIG. 6 is a block diagram of the control method employed with the embodiments of FIGS. 3–5.

The output correction operation section 37 calculates the amount of ignition advance or delay angle to increase or decrease the engine output according to the result of determination of increase or decrease in the output in a manner to be described by reference to FIG. 6. It is preferable to calculate the output control amount or the amount of advance or delay in the ignition angle according to not only the degree-of-rotational speed variation D and the degree-of-rotational speed variation change D' but also the rotational speed. In this way, it is possible to control the ignition timing more finely according to whether the engine is operating at high or low rotational speed.

The ignition timing determining section 38 determines basic ignition timing in normal engine operation according to the revolution and engine load, and produces final ignition signal after adding or subtracting the ignition timing correction amount calculated as described above with the output correction operation section 37 to and from the basic ignition timing. According to the ignition signal, the ignition coil 32 is activated through the ignition circuit 28 to produce a spark at the ignition plug of the engine. Again one way that this is done will be described later by reference to FIG. 6.

Figure 3:
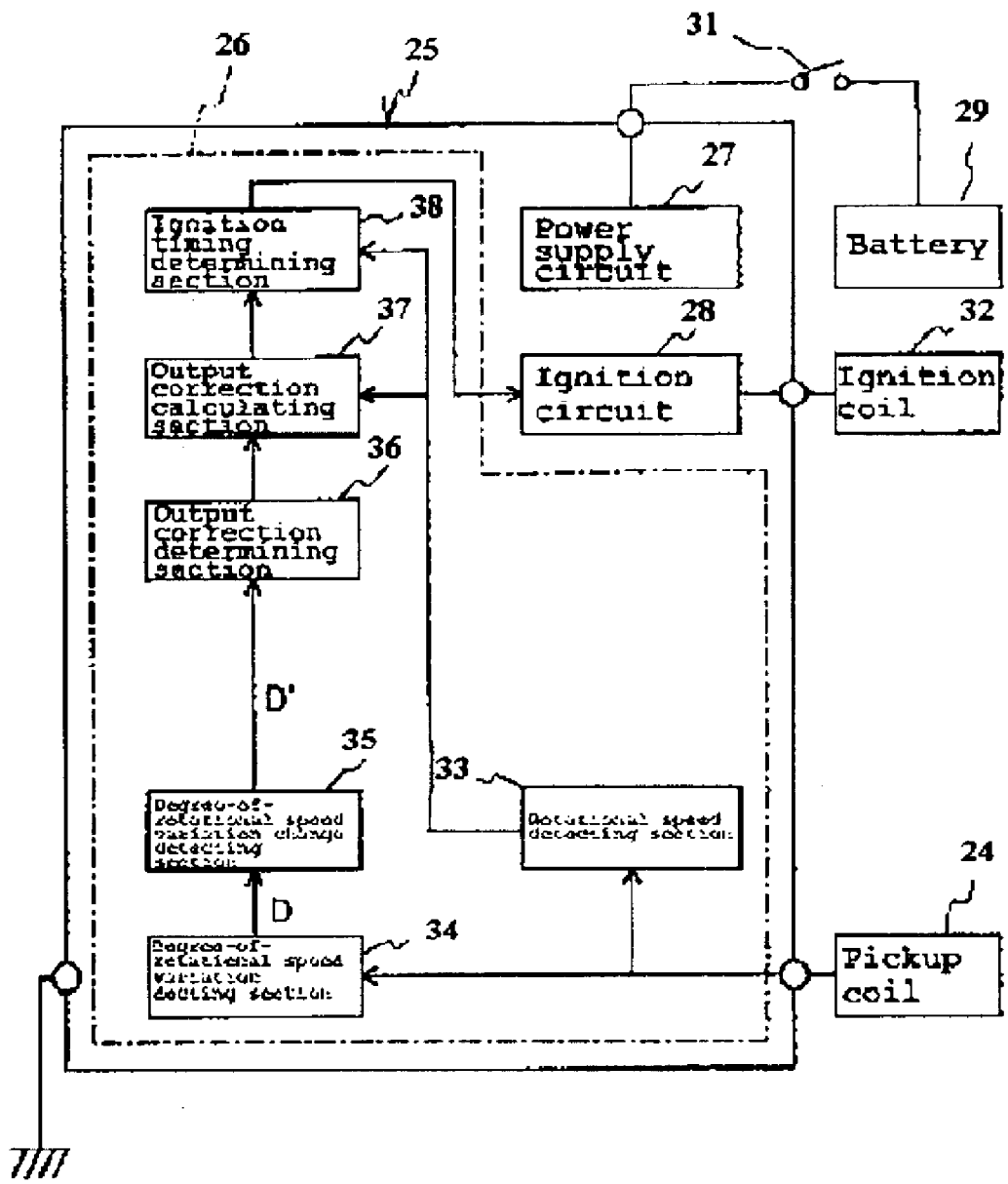
FIG. 3 is a schematic view of a first embodiment of engine ignition control system for practicing the invention.
Figure 4:
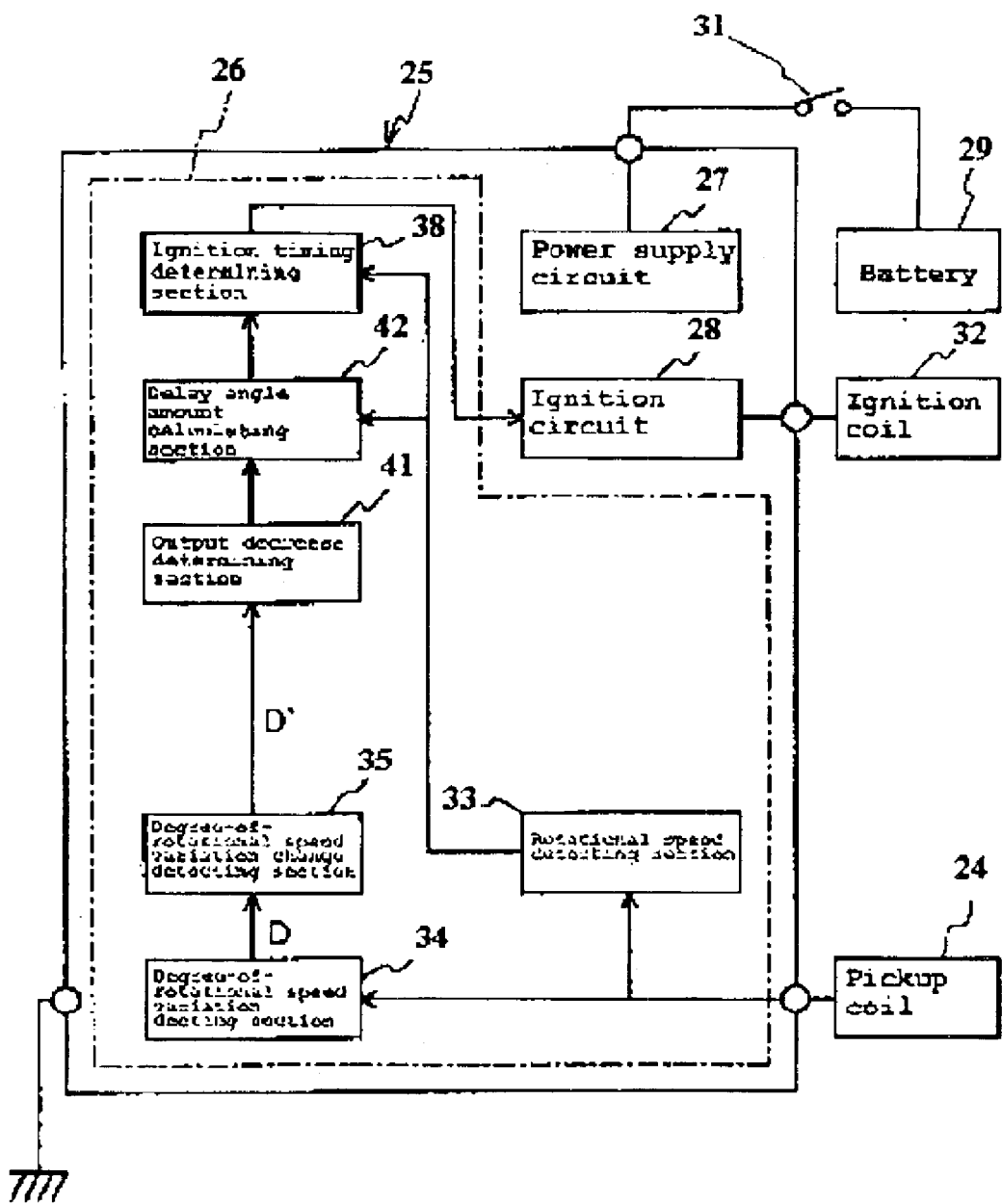
FIG. 4 is a schematic view, in part similar to FIG. 3, of a second embodiment of engine ignition control system for practicing the invention.

Referring now to FIG. 4, this is a block diagram of a second embodiment of the present invention. It is in major part similar to the embodiment of FIG. 3 and where components are the same or similar to those of that embodiment they have been identified by the same reference numerals and will be described again only where necessary to understand this embodiment.

This embodiment is for preventing a motorcycle from making a wheelie by restricting the engine output when the motorcycle starts moving at a rapid acceleration. To that end, this embodiment is provided with an output decrease determining section 41 corresponding to the output correction determining section 36 shown in FIG. 3 for determining the necessity of a decrease in the output based on the degree of rotational speed variation D or D". This embodiment is also provided with a delay angle amount calculating section 42 for calculating the ignition delay angle amount according to the result of the determination corresponding to the output correction calculating section 37 of the embodiment of FIG. 3. Otherwise this embodiment is the same both in constitution and function as the example shown in FIG. 3 and thus further description of this embodiment is not believed to permit those skilled in the art to understand its operation and function.

Figure 5:
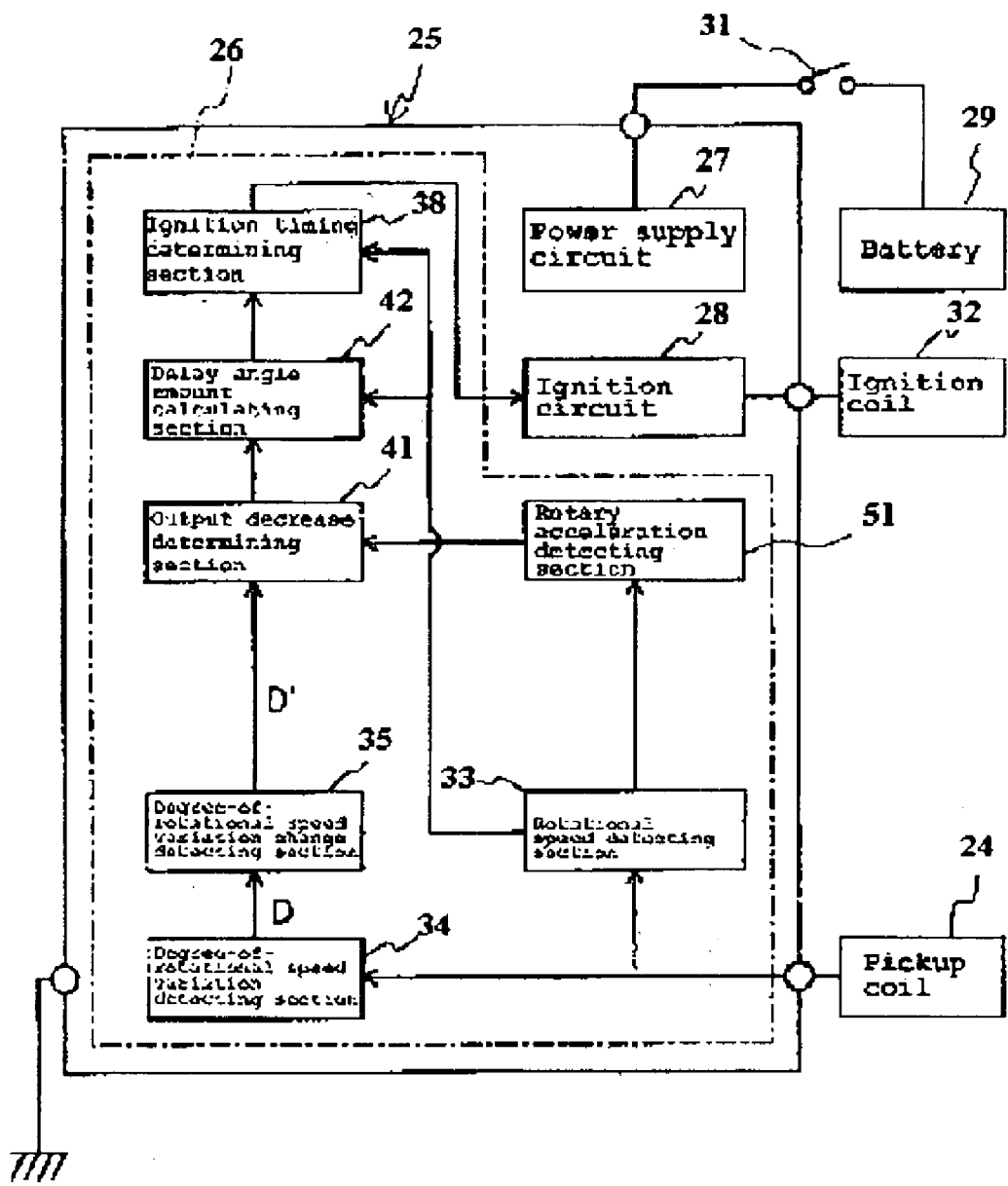
FIG. 5 is a schematic view, in part similar to FIGS. 3 and 4, of a third embodiment of engine ignition control system for practicing the invention.

Referring now to FIG. 5, this is a block diagram of a third embodiment of the present invention. It is in major part similar to the embodiments of FIGS. 3 and 4 and where components are the same or similar to those of those embodiments they have been identified by the same reference numerals and will be described again only where necessary to understand this embodiment.

Referring now specifically to FIG. 5, in this embodiment, a rotary acceleration detecting section 51 is connected to the rotational speed detecting section 33 to calculate acceleration by differentiating speed signals. The rotary acceleration signal from the section 51 is supplied to the output decrease determining section 41 of the embodiment of FIG. 4 to determine if the output is to be decreased based on the rotary acceleration signal as well as on the above-mentioned values of D and D'. Other than this, this embodiment is the same as that of FIG. 4 both in constitution and function and further description of its structure and operation is believed unnecessary to understand this embodiment.

The method of operation of the embodiments of FIGS. 3, 4 and 5 will now be described by reference to FIG. 6. After the program starts, the degree of rotational speed variation detecting section 34 calculates the degree-of-rotational speed variation D at the step S1. This amount is then transmitted to the degree-of-rotational speed variation change detecting section 35 which calculates the degree-of-rotational speed variation change D' within a predetermined period of time at the step S2.

The program then moves to the step S3 where either the output correction determining section 36 in the embodiment of FIG. 3 or the output decrease determining section 41 of the embodiments of FIG. 4 or 5 determines whether the degree of rotational speed variation D is not less than a predetermined reference value D0. If D is less than D0, that is the degree of rotational speed variation is small, the ignition timing determining section 38 calculates a basic ignition timing Î± for the normal running mode at the step S4.

If however at the step S3 it is determined that D is not less than D0, the output correction determining section 36 in the embodiment of FIG. 3 or the output decrease determining section 41 of the embodiments of FIG. 4 or 5 determines whether the degree of rotational speed variation change D' is not less than a predetermined reference value D'0 at the step S5. If it is determined that D' is not less than D'0, the program moves to the step S6 where either the output correcting calculating section 37 of the embodiment of FIG. 3 or the delay angle amount calculating section 42 of the embodiments of FIG. 4 or 5 calculates a delay angle amount Î±. Then at the step S7, the ignition timing determining section 17 subtracts the delay angle amount Î² from the basic ignition timing Î± to obtain a final, corrected ignition timing (Î±−Î²).

However when D' is less than D'0, at the step S8 output correcting calculating section 37 of the embodiment of FIG. 3 or the delay angle amount calculating section 42 of the embodiments of FIG. 4 or 5 calculates a delay angle amount Î³. Then at the step S9 the ignition timing determining section 38 subtracts the delay angle amount Î³ from the basic ignition timing Î± to obtain a final, corrected ignition timing (Î±−Î³).

Finally at the step S10 the final ignition timing Î±, (Î±−Î²), or (Î±−Î³) calculated with the ignition timing determining section 38, the ignition coil 32 is activated through the ignition circuit 28 to produce spark at the ignition plug of the engine.

Figure 7:
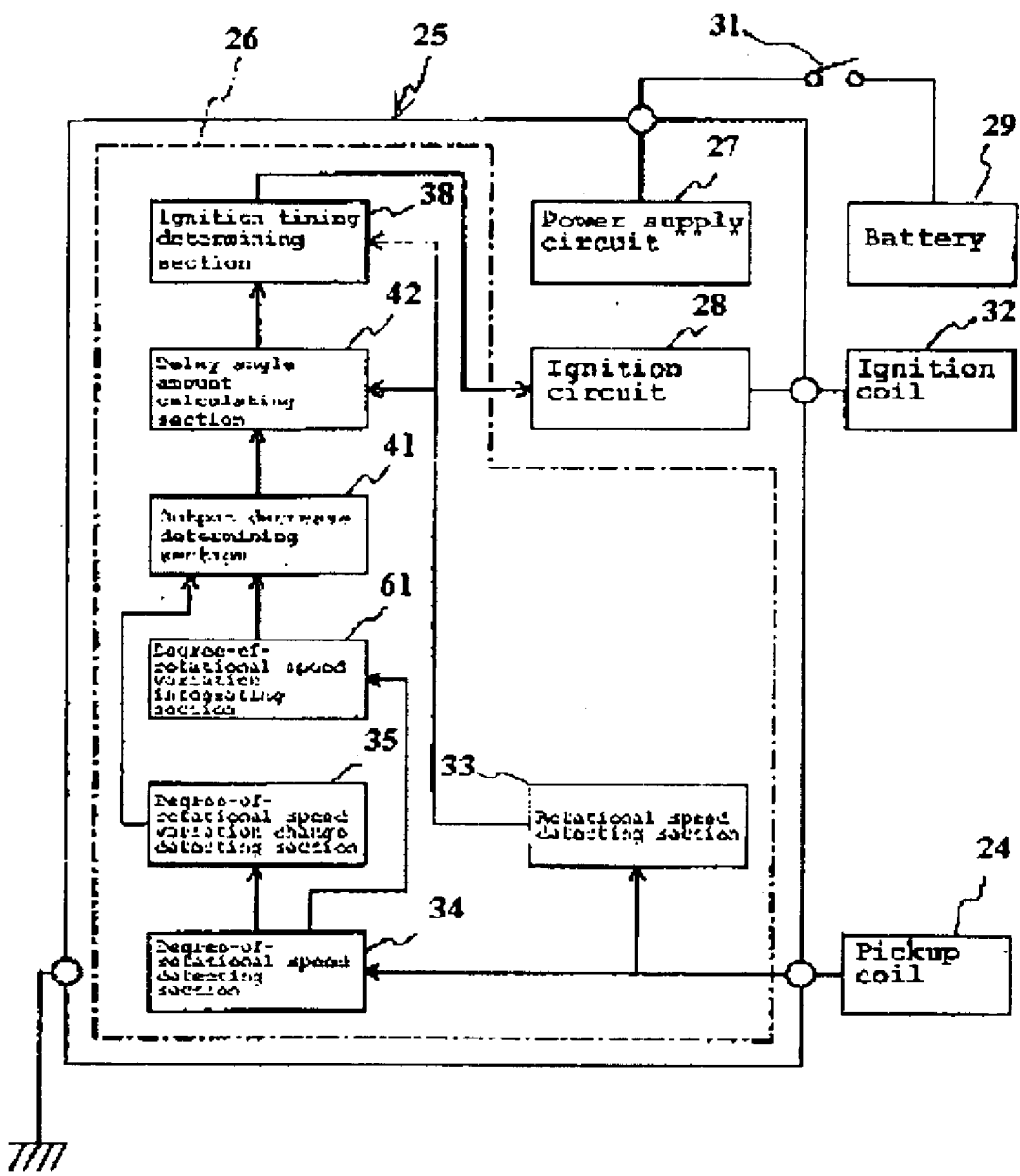
FIG. 7 is a schematic view, in part similar to FIGS. 3–5, of a fourth embodiment of engine ignition control system for practicing the invention.

FIG. 7 shows fourth embodiment of the invention in major part similar to the embodiment of FIG. 4 and where components are the same or similar to those of those embodiments they have been identified by the same reference numerals and will be described again only where necessary to understand this embodiment. This embodiment is provided with a degree of rotational speed variation integrating section 61 connected to the degree of rotational speed variation detecting section 34. This makes it possible to determine the engine operation state-more finely using judgment elements of the integrated value up to that time in addition to the change in the degree of rotational speed variation, and to obtain an optimum delay angle amount of the ignition timing. Otherwise this embodiment is the same both in constitution and function as the previously described embodiment of FIG. 4 and further description is therefore deemed unnecessary.

Figure 8:
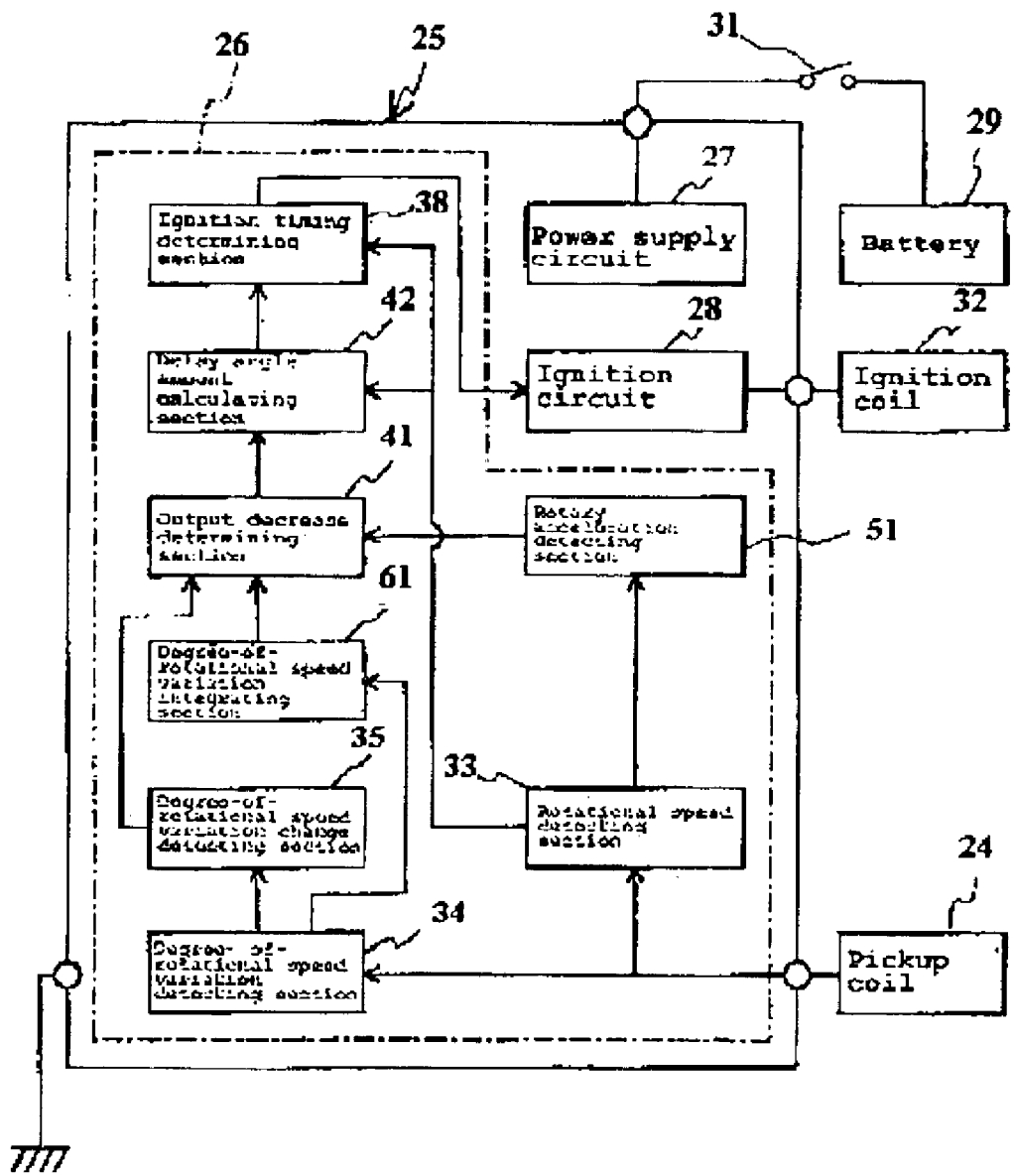
FIG. 8 is a schematic view, in part similar to FIGS. 3–5 and 7, of a fifth embodiment of engine ignition control system for practicing the invention.

FIG. 8 shows a fifth embodiment of the invention that is in major part similar to the embodiments of FIGS. 5 and 7 and where components are the same or similar to those of those embodiments they have been identified by the same reference numerals and will be described again only where necessary to understand this embodiment. This embodiment is provided with a rotary acceleration detecting section 51 connected to the rotational speed detecting section 33 to calculate acceleration by differentiating speed signals. The rotary acceleration signal is supplied to the output decrease determining section 41 to determine if the output is to be decreased based on the acceleration in addition to the above-mentioned values of D and D' and the integrated value. Otherwise this embodiment is the same as the example shown in FIG. 7 both in constitution and function.

Figure 9:
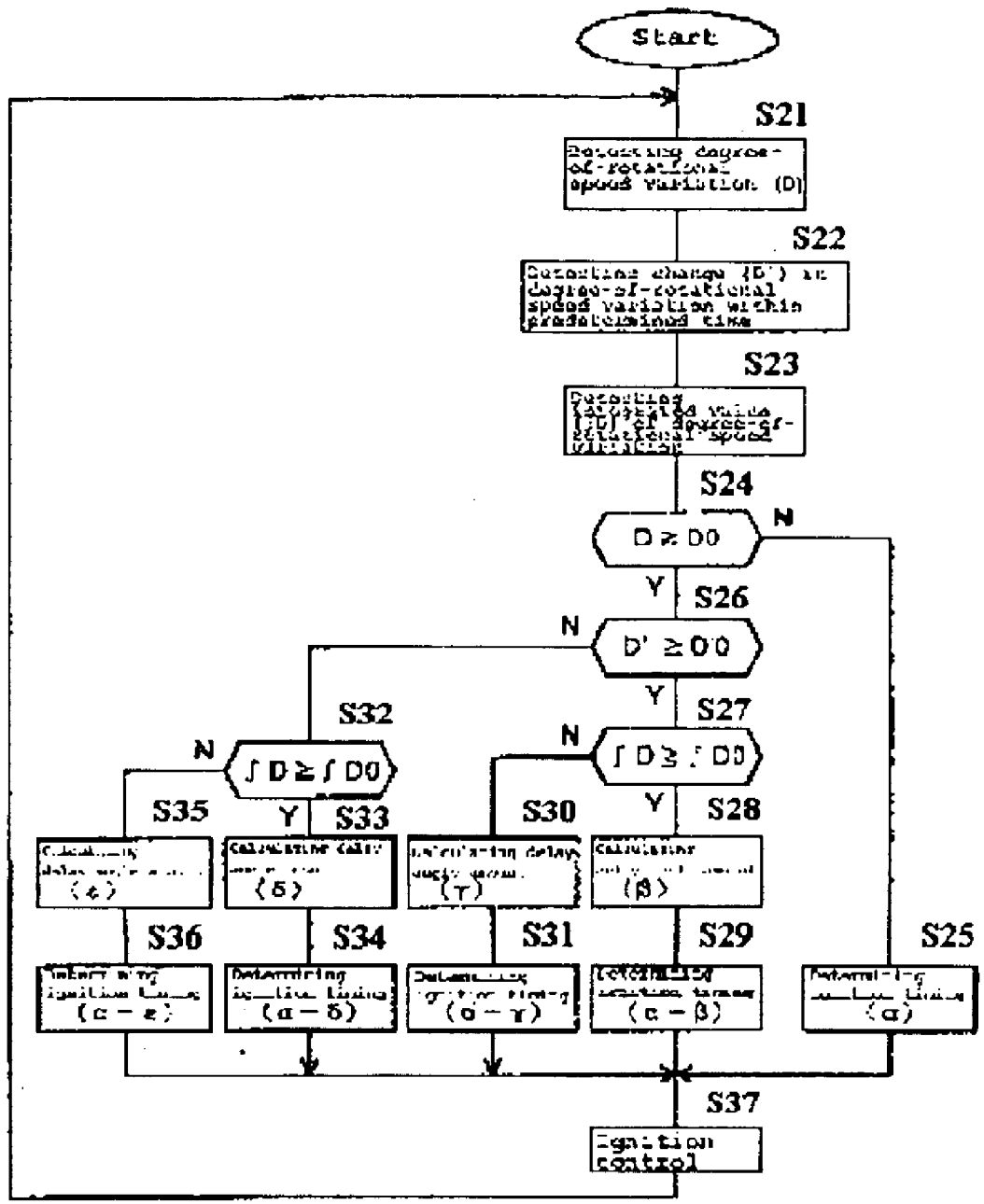
FIG. 9 is a block diagram of the control method employed with the embodiments of FIGS. 7 and 8.

The operation of the embodiments of FIGS. 7 and 8 will now be described by reference to FIG. 9. When the program starts, at the step S21, the degree-of-rotational speed variation detecting section 34 calculates the degree of rotational speed variation D. Then at the step S22 the degree of rotational speed variation change detecting section 35 calculates the degree-of-rotational speed variation change D' within a predetermined period of time. The degree of rotational speed variation integrating section 61 then calculates an integrated value ∫D of the degree-of-rotational speed variation at the step S23.

This information is then compared at the step S24 to determine by the output decrease determining section 41 if the degree of rotational speed variation D is not less than a predetermined reference value D0. If this value is small, the ignition timing determining section 38 calculates the basic ignition timing Î± for the normal running mode at the step S25.

However if at the step S24 the value of D is not less than D0, the output decrease determining section 41 determines whether the degree of rotational speed variation change D' is not less than the predetermined reference value D'0 at the step S26. In the case D' is not less than D'0, the output decrease determining section 41 determines whether the integrated value $\Sigma D$ is not less than a predetermined reference value $\Sigma D0$ at the step S27. If it is, then at the step S28 the delay angle amount calculating section 42 calculates a delay angle amount $\hat{I}^2$. The ignition timing determining section 38 then subtracts the delay angle amount $\hat{I}^2$ from the basic ignition timing $\hat{I}\pm$ to obtain a corrected, final ignition timing $(\hat{I}\pm-\hat{I}^2)$ at the step S291 at the step S27 the value of $\Sigma D$ is less than $\Sigma D0$, the delay angle amount calculating section 42 calculates a delay angle amount $\hat{I}^3$ at the step S30. Then at the step S31 the ignition timing determining section 38 makes a correction by subtracting the delay angle amount $\hat{I}^3$ from the basic ignition timing $\hat{I}\pm$ to obtain a final ignition timing $(\hat{I}\pm-\hat{I}^3)$.

Returning now to the step S26, if the value of D' is not greater than D'0, at the step, the output decrease determining section 41 determines whether the integrated value $\Sigma D$ is not less than a predetermined reference value $\Sigma D0$ at the step S32. In the case $\Sigma D$ is not less than $\Sigma D0$, the delay angle amount calculating section 42 calculates a delay angle amount $\hat{I}'$ at the step S33. Then at the step S34 the ignition timing determining section 38 subtracts the delay angle amount $\hat{I}'$ from the basic ignition timing $\hat{I}\pm$ to obtain a corrected, final ignition timing $(\hat{I}\pm-\hat{I}')$.

If at the step S32 the value of $\Sigma D$ is less than $\Sigma D0$, the delay angle amount calculating section 42 calculates a delay angle amount $\hat{I}\mu$ at the step S35. Then at the step S36 the ignition timing determining section 38 subtracts the delay angle amount $\hat{I}\mu$ from the basic ignition timing $\hat{I}\pm$ to obtain a corrected, final ignition timing $(\hat{I}\pm-\hat{I}\mu)$.

Finally the ignition is initiated at the step S37 according to the final ignition timing $\hat{I}\pm$, $(\hat{I}\pm-\hat{I}^2)$, $(\hat{I}\pm-\hat{I}^3)$, $(\hat{I}\pm-\hat{I}')$ or $(\hat{I}\pm-\hat{I}\mu)$ calculated in the ignition timing determining section 38 from the results of steps S25, S29 S31, S34 or S36, respectively the ignition coil 32 is activated through the ignition circuit 28 to produce spark with the ignition plug of the engine.

Figure 10:
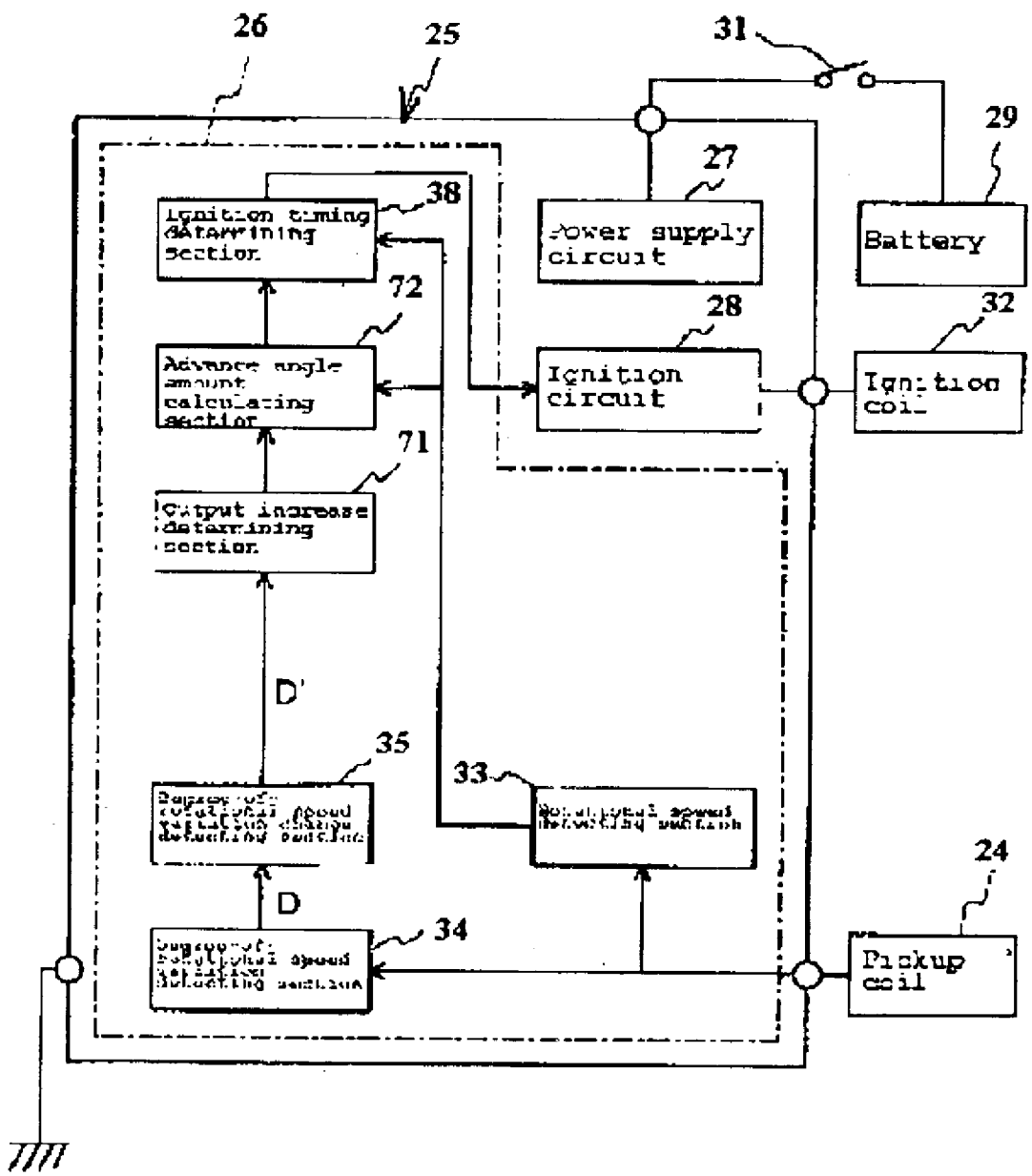
FIG. 10 is a schematic view, in part similar to FIGS. 3–5, 7 and 8, of a sixth embodiment of engine ignition control system for practicing the invention.

Referring now to FIG. 10, this shows a sixth embodiment of the invention. This embodiment is to improve acceleration performance by increasing the output when a vehicle starts acceleration from a normal running state. The function of this embodiment is similar to and based upon that of the embodiment shown in FIG. 3 and where components are the same they have been identified by the same reference numbers and will be described again only where necessary to understand the construction and operation of this embodiment.

This embodiment is provided with an output increase determining section 71, in place of the output correction determining section 36 shown in FIG. 3, for determining the necessity of an output increase correction based on the degree of rotational speed variation D and/or its change D'. The output from the output increase determining section 71 is transmitted to an advance angle amount calculating section 72 for calculating the ignition advance angle amount based on the determined result. Otherwise this embodiment is the same in constitution and function as the example shown in FIG. 3 and therefore further description is not believed necessary to permit those skilled in the art to practice this embodiment.

Figure 11:
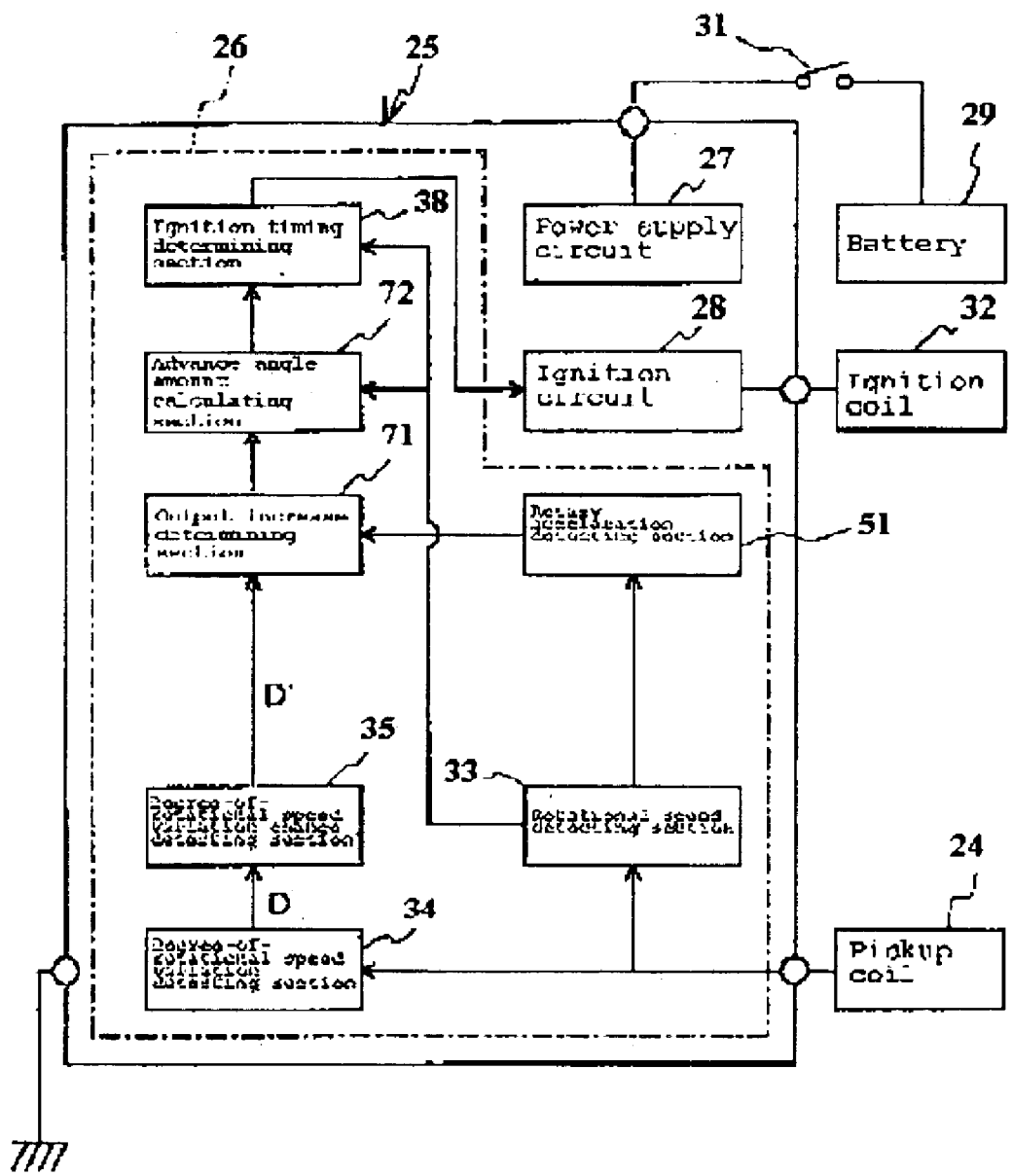
FIG. 11 is a schematic view, in part similar to FIGS. 3–5, 7, 8 and 10 of a seventh embodiment of engine ignition control system for practicing the invention.

FIG. 11 shows a seventh embodiment of the invention that is based in part on the embodiment of FIG. 10. Again where components are the same as those of previous embodiments, they have been identified by the same reference numerals. This embodiment adds to the embodiment of FIG. 10 a rotary acceleration detecting section 51, as utilized in the embodiments of FIGS. 5 and 8 connected to the rotational speed detecting section 33 to calculate acceleration by differentiating speed signals. The signal of the rotary acceleration is supplied to the output increase determining section 71 to determine if the output is to be increased according to the acceleration in addition to D and D' as previously described.

Figure 12:
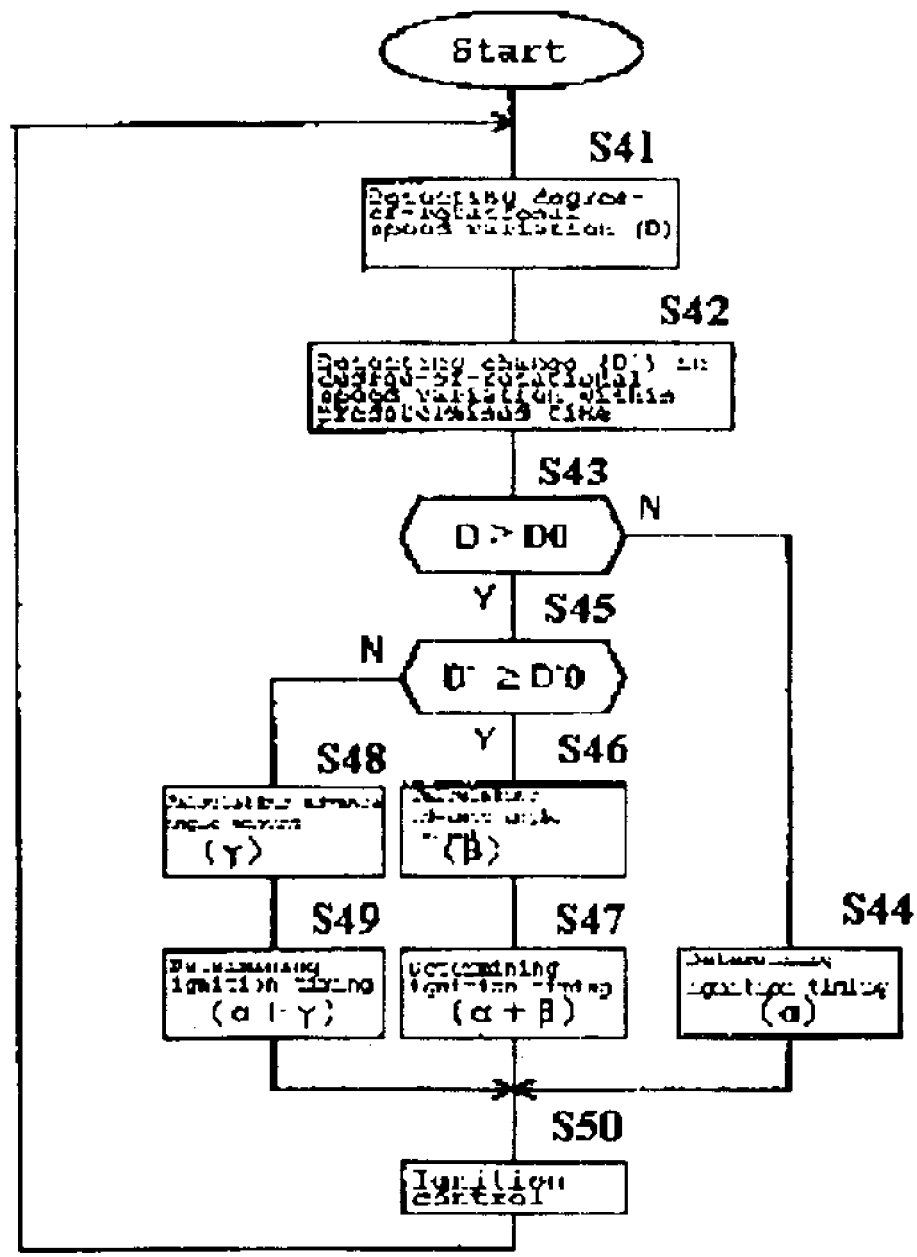
FIG. 12 is a block diagram of the control method employed with the embodiments of FIGS. 10 and 11.

The operation of the embodiments of FIGS. 10 and 11 will now be described by reference to the block diagram of FIG. 12. The program starts and moves to the step S41 where the degree of rotational speed variation detecting section 34 calculates a degree of rotational speed variation D. This information is transmitted at the step S42 to the degree of rotational speed variation change detecting section 35 which calculates the degree of rotational speed variation change D' within a predetermined period of time.

Then at the step S43 the output increase determining section 71 determines whether the degree of rotational speed variation D is not less than the predetermined reference value D0. If it is not, the degree of rotational speed variation is small, and thus at the step S44 the ignition timing determining section 38 calculates the basic ignition timing $\hat{I}\pm$ for the normal running mode.

However if at the step S43 it is determined that the degree of rotational speed variation is not small then the program moves to the step S45 where the output increase determining section 71 determines whether the degree of rotational speed variation change D' is not greater than the predetermined reference value D'0. If it is not, then at the step S46 the advance angle amount calculating section 72 calculates an advance angle amount $\hat{I}^2$. Then at the step S47 the ignition timing determining section 38 adds the advance angle amount $\hat{I}^2$ to the basic ignition timing $\hat{I}\pm$ to obtain a corrected, final ignition timing $(\hat{I}\pm+\hat{I}^2)$.

However if at the step S45 it is determined that the degree of rotational speed variation change D" is not greater than the predetermined reference value D"0, at the step S48 the advance angle amount calculating section 72 calculates an advance angle amount $\hat{I}^3$. Then at the step S49 the ignition timing determining section 17 adds the advance angle amount $\hat{I}^3$ to the basic ignition timing $\hat{I}\pm$ to obtain a corrected, final ignition timing $(\hat{I}\pm+\hat{I}^3)$.

Having determined the final ignition timing $\hat{I}\pm$, $(\hat{I}\pm+\hat{I}^2)$, or $(\hat{I}\pm+\hat{I}^3)$, at either the steps S44, S47 or S49 at the step S50 the ignition timing determining section 38 outputs a signal to the ignition circuit 28 so that the ignition coil 32 is activated to cause the ignition coil 32 produce a spark at the ignition plug of the engine.

Figure 13:
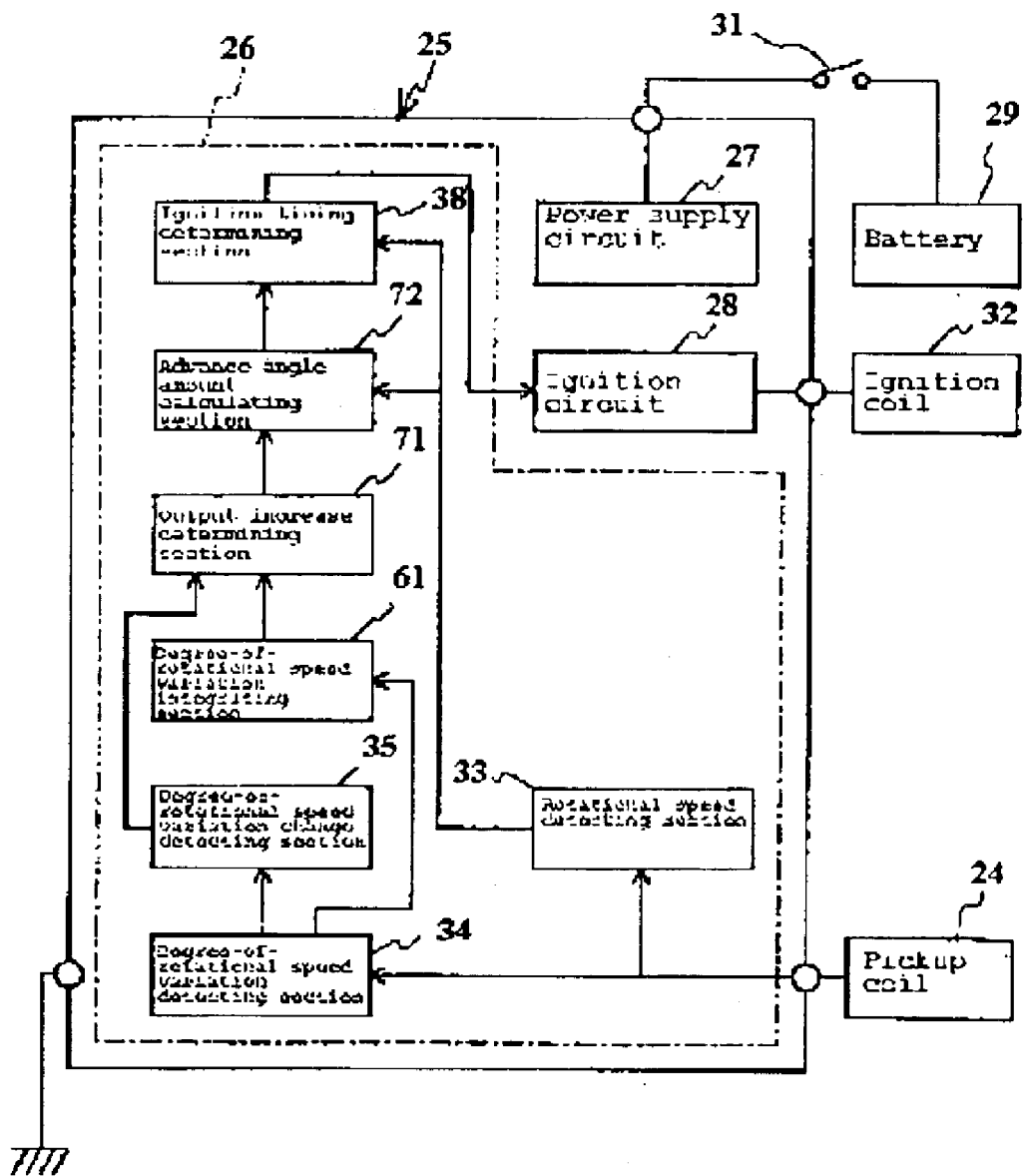
FIG. 13 is a schematic view, in part similar to FIGS. 3–5,7, 8, 10 and 11, of an eighth embodiment of engine ignition control system for practicing the invention.

FIG. 13 shows an eighth embodiment of the invention that is based on the embodiment of FIG. 10 and thus like components are identified by like reference numerals and will be described again only where necessary to understand this embodiment. This embodiment is provided with a degree of rotational speed variation integrating section 61 connected to the degree of rotational speed variation detecting section 34 as used in the embodiments of FIGS. 7 and 8. This makes it possible to determine the engine operation state more finely using judgment elements of the integrated value up to that time in addition to the change in the degree of rotational speed variation, and to obtain an optimum advance angle amount of the ignition timing.

Figure 14:
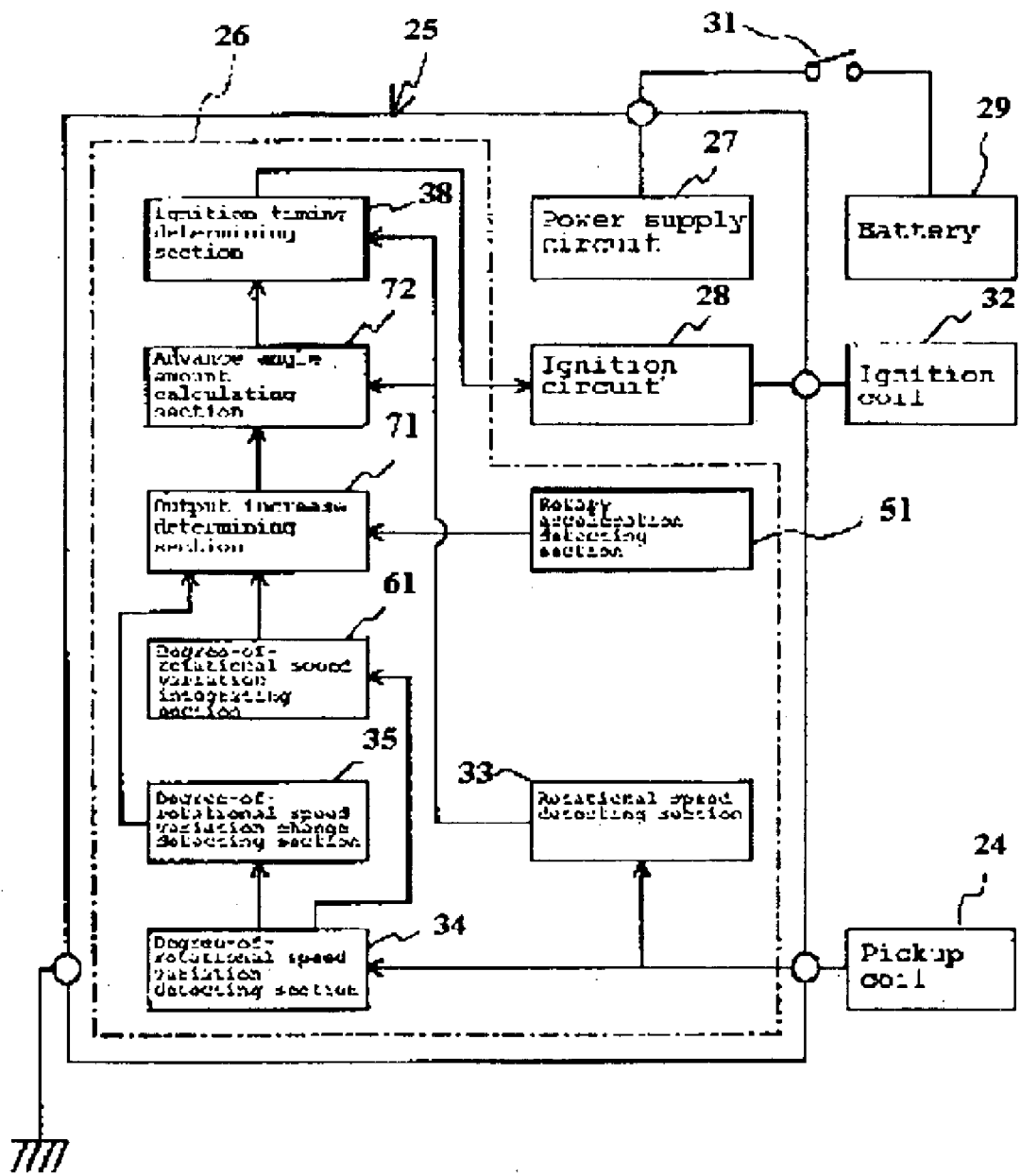
FIG. 14 is a schematic view, in part similar to FIGS. 3–5,7, 8, 10, 11 and 13 of a ninth embodiment of engine ignition control system for practicing the invention.

FIG. 14 shows a ninth embodiment of the invention that is based on the embodiment of FIG. 13 but further adds rotary acceleration detecting section 51 connected to the rotational speed detecting section 33 to calculate acceleration by differentiating speed signals as in the embodiments of FIGS. 5, 8 and 11. The signal of the rotary acceleration is supplied to the output increase determining section 71 to determine if the output is to be increased according to the acceleration in addition to D and D' as described above.

Figure 15:
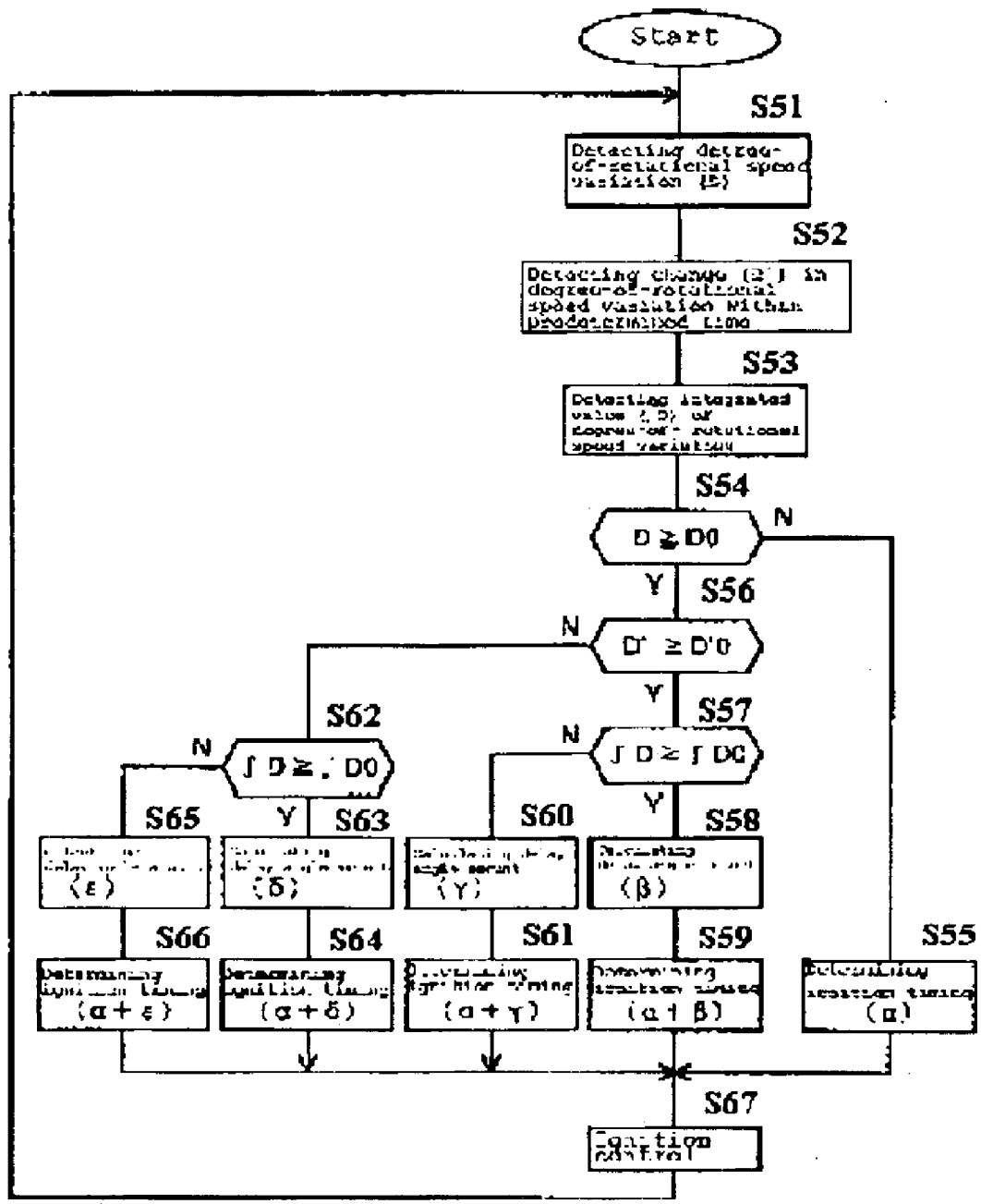
FIG. 15 is a block diagram of the control method employed with the embodiments of FIGS. 13 and 14.

The operation of the embodiments of FIGS. 13 and 14 will now be described by reference to the block diagram of FIG. 15. The program starts and moves to the step S51 where the degree of rotational speed variation detecting section 34 calculates a degree-of-rotational speed variation D. Then at the step S52 the degree of rotational speed variation change detecting section 35 calculates the degree of rotational speed variation change D' within a predetermined period of time. Subsequently at the step S53 the degree of rotational speed variation integrating section 61 calculates an integrated value â☐D of the degree-of-rotational speed variation.

This value is then compared at the step S54 the output increase determining section 71 determines whether the degree of rotational speed variation D is greater than the predetermined reference value D0. If it is not it is small, then at the step S55 the ignition timing determining section 38 calculates the basic ignition timing Î± for the normal running mode.

If however at the step S54 the degree of rotational speed variation is greater, then at the step S56 the output increase determining section 71 determines whether the degree of rotational speed variation change D' is not less than the predetermined reference value D"0. If it is not less than this value the program moves to the step S57 where the output increase determining section 71 determines whether the integrated value â☐D is not less than a predetermined reference value â☐D0. If it is greater then at the step S58 the advance angle amount calculating section 72 calculates an advance angle amount $Î^2$ and at the step S59 The ignition timing determining section 38 adds the advance angle amount $Î^2$ to the basic ignition timing Î± to obtain a corrected, final ignition timing ($Î±+Î^2$).

If at the step S57 In the case â☐D is less than â☐D0, the advance angle amount calculating section 72 calculates an advance angle amount $Î^3$ at the step S60. Then at the step S61, the ignition timing determining section 38 adds the advance angle amount $Î^3$ to the basic ignition timing Î± to obtain a corrected, final ignition timing ($Î±+Î^3$).

Returning now to the step S56, in the case D" is less than D"0, then the program moves to the step S62 where the output increase determining section 71 determines whether the integrated value â☐D is not less than a predetermined reference value â☐D0. If it is greater then at the Step S63 the advance angle amount calculating section 72 calculates an advance angle amount Î' and at the step S64 the ignition timing determining section 38 adds the advance angle amount Î' to the basic ignition timing Î± if to obtain a corrected, final ignition timing (Î±+Î').

If however at the step S62 D' is not less than D'0, then the program moves to the step S65 where the advance angle amount calculating section 16b calculates an advance angle amount Î$\mu$ and then to the step S66 where the ignition timing determining section 17 adds the advance angle amount Î$\mu$ to the basic ignition timing Î± to obtain a corrected, final ignition timing (Î±+Î$\mu$).

Once the values the final ignition timing Î±, ($Î±+Î^2$), ($Î±+Î^3$), (Î±+Î'), or (Î±+Î$\mu$) are calculated in the ignition timing determining section 38 at the steps S55, S59, S61, S64 or S66, the ignition coil 32 is activated by the ignition circuit 28 to produce a spark at the ignition plug of the engine.

Thus from the foregoing description it should be apparent that the described embodiments provide an improved engine system control method and apparatus based on operator demand and rate of change in demand that reduces not only the number of components but also decreases the complexity of the electronic system. Also none of these embodiments require a throttle position sensor. Those skilled in the art will however understand that the described embodiments are only preferred embodiments of the invention and that various changes and modifications may be made without departing from the spirit and scope of the invention, as defined by the appended claims.

What is claimed is:

1. An internal combustion engine and control system therefore, said engine comprising a driven shaft, a sensor arrangement associated with said driven shaft for sensing the rotational speed of the driven shaft during the rotation of the driven shaft, an engine control system for controlling a running condition of said engine, said engine speed sensor senses the instantaneous rotational speed of said driven shaft during the rotation of said driven shaft for less than a complete rotation and senses the rotational speed of said driven shaft for a complete revolution thereof including the measured less than complete rotation, and determines a basic condition of said engine from these measurements and providing a control signal to said engine control system based on said sensed basic condition, a system for said degree of change in said basic condition during the cycle interval is other than a predetermined amount said control signal to said engine control system is changed to compensate for the altered condition.

2. An internal combustion engine and control system therefore as set forth in claim 1, wherein said engine speed sensor senses the instantaneous rotational speed of the driven shaft during the rotation of said driven shaft for less than a complete rotation and senses the rotational speed of said driven shaft for a complete revolution thereof including the measured less than complete rotation, and determines the engine basic condition from these measurements.

3. An internal combustion engine and control system therefore as set forth in claim 1, wherein the engine basic condition is determined by the change in engine speed during successive intervals.

4. An internal combustion engine and control system therefore as set forth in claim 1, wherein the engine system controlled is the ignition system.

5. An internal combustion engine and ignition control system therefore, said engine comprising a driven shaft, a sensor arrangement associated with said driven shaft for sensing the rotational speed of the driven shaft for less than a complete rotation and sensing the rotational speed of said driven shaft for a complete revolution thereof including the measured less than complete rotation and during the rotation of the driven shaft, an engine control system for engine, said engine speed sensor determining the load on said engine from the measured speeds for providing a signal to said ignition system for determining the timing of firing said ignition system in response to engine load, said engine speed sensor further providing a signal if the engine load change is greater than a predetermined amount for altering said engine control system.

6. A method of controlling an internal combustion comprising a driven shaft, a sensor arrangement associated with the driven shaft for sensing the rotational speed of the driven shaft for less than a complete rotation and sensing the rotational speed of said driven shaft for a complete revolution thereof including the measured less than complete rotation and during the rotation of the driven shaft, and an engine control system for the engine, said method comprising determining a change in the load on said engine from the output of the engine speed sensor and if said engine load change is greater than a predetermined for modifying the condition of the engine control system.

7. A method of operating an internal combustion engine as set forth in claim 6, wherein said engine speed sensor senses the instantaneous rotational speed of the driven shaft during the rotation of said driven shaft for less than a complete rotation and senses the rotational speed of said driven shaft for a complete revolution thereof including the measured less than complete rotation, and the engine load is determined from these measurements.

8. A method of operating an internal combustion engine as set forth in claim 6, wherein the engine load is determined by the change in engine speed during successive intervals.

9. A method of operating an internal combustion engine as set forth in claim 6, wherein the engine load is also utilized to set the basic engine control system setting in addition to modifying the setting thereof.

10. A method of operating an internal combustion engine comprising a driven shaft, a sensor arrangement associated with said driven shaft for sensing the rotational speed of the driven shaft for less than a compete rotation and sensing the rotational speed of said driven shaft for a complete revolution thereof including the measured less than complete rotation and during the rotation of the driven shaft, an engine control system for the engine, said method comprising the steps of utilizing the engine speed sensor for determining the load on the engine for providing a signal to the engine control system for determining the setting of the engine control system in response to engine load, and also employing the engine speed sensor to providing a signal if the engine load change is greater than a predetermined amount for altering the engine control system setting.

* * * * *

UNITED STATES PATENT AND TRADEMARK OFFICE
CERTIFICATE OF CORRECTION

PATENT NO.     : 6,892,702 B2
DATED          : May 17, 2005
INVENTOR(S)    : Naoya Isoda et al.

It is certified that error appears in the above-identified patent and that said Letters Patent is hereby corrected as shown below:

Column 3,
Line 34, "Â°" should read -- ° --.

Column 5,
Lines 62, 64 and 65, "Î±" should read -- α --.
Lines 63 and 65, "Î²" should read -- β --.

Column 6,
Lines 4, 6 and 8, "Î³" should read -- γ --.
Lines 5, 6, 7, 8 and 61, "Î±" should read -- α --.
Line 7, "Î²" should read -- β --.
Line 54, "âD" should read -- ∫ --.

Column 7,
Lines 2, 3, 9, 18, 19, 20 and 26, "âD" should read -- ∫ --.
Lines 5, 6 and 8, "Î²" should read -- β --.
Lines 7, 8, 24, 25, 31, 32, 34 (both occurrences), "Î±" should read -- α --.
Lines 14, 15 and 34, "Î³" should read -- γ --.
Lines 22, 24, 25 and 34, "Î'" should read -- δ --.
Lines 28, 30 and 34, "îµ'" should read -- ε --.

Column 8,
Lines 24, 34, 35, 43, 44, 45 and 46, "Î±" should read -- α --.
Lines 43, 44 and 45, "Î³" should read -- γ --.

Column 9,
Lines 15, 31 and 32, "âD" should read -- ∫ --.
Lines 22, 36, 37, 42, 43, 52, 53, 54, 60, 62 and 63, "Î±" should read -- α --.
Lines 40, 42 and 43, "Î³" should read -- γ --.
Lines 53, 54 and 63, "Î'" should read -- δ --.
Lines 58, 61 and 63. "îµ'" should read -- ε --.

UNITED STATES PATENT AND TRADEMARK OFFICE
CERTIFICATE OF CORRECTION

PATENT NO. : 6,892,702 B2
DATED : May 17, 2005
INVENTOR(S) : Naoya Isoda et al.

It is certified that error appears in the above-identified patent and that said Letters Patent is hereby corrected as shown below:

<u>Column 10, lines 32-39 and Column 11, lines 7-14,</u>
Claims 2 and 7 should be deleted and the remaining claims renumbered in order.

After this renumbering, Claims 8 and 9 (renumbered as claims 6 and 7, respectively) should depend on Claim 5 incorrectly numbered as claim 6.

Signed and Sealed this

Twenty-fifth Day of April, 2006

JON W. DUDAS
*Director of the United States Patent and Trademark Office*